Oct. 28, 1952   I. H. STEINHARDT   2,615,269
MOLDED ARTICLE
Filed Nov. 7, 1947
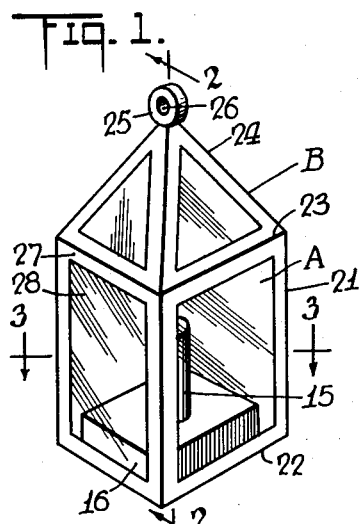
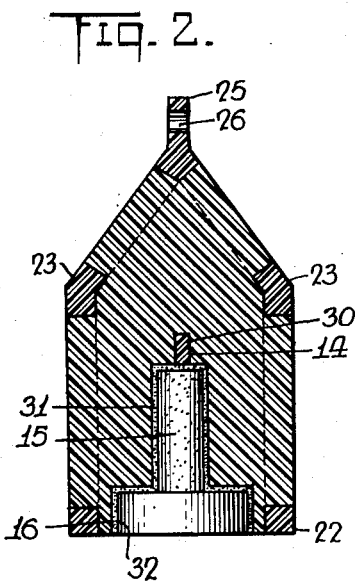
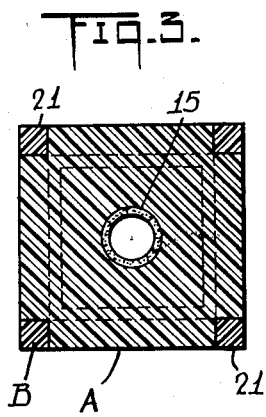
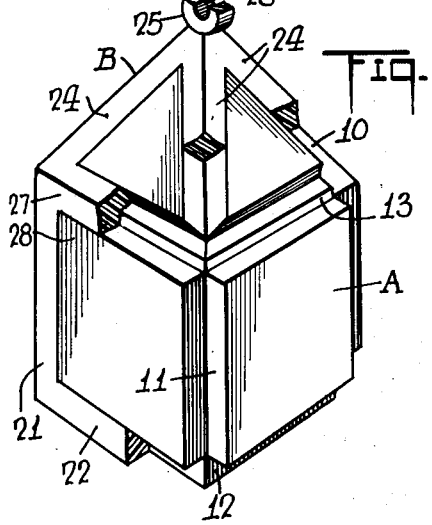
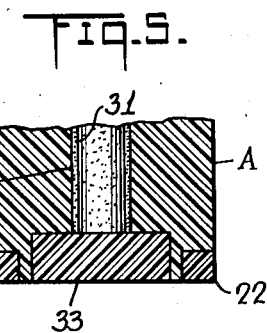
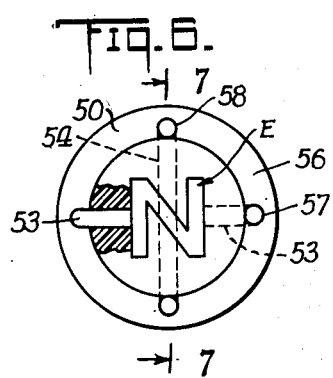
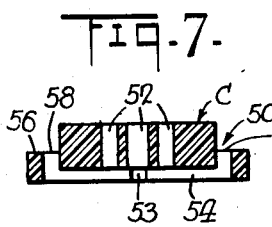
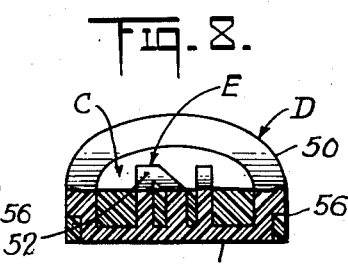
INVENTOR.
I. Hartley Steinhardt
BY
ATTORNEY.

Patented Oct. 28, 1952

2,615,269

UNITED STATES PATENT OFFICE 2,615,269

MOLDED ARTICLE

I. Hartley Steinhardt, New York, N. Y.

Application November 7, 1947, Serial No. 784,602

2 Claims. (Cl. 41—10)

The present invention relates to molded articles and it particularly relates to molded articles of synthetic resins or plastics.

It is among the objects of the present invention to provide a molded article of two or more different types, colors and/or textures, of synthetic resins or plastics which will be combined into an ornamental composition of decorative appearance.

A further object is to provide a novel framed or decorated plastic article having a base of one color or texture of plastic and a frame or outline or design superimposed on or around the base of another contrasting color, appearance, design or shape.

Still further objects and advantages will appear in the more detailed description set forth below, it being understood, however, that this more detailed description is given by way of illustration and explanation only and not by way of limitation, since various changes may be made therein by those skilled in the art without departing from the scope and spirit of the present invention.

In accomplishing the above objects, it has been found to be most satisfactory first to mold a base element, as, for example, a base of a typewriter key, an ornament, a lamp, an animal or human figure, a miniature piece of furniture or a house, a facing for costume jewelry, and so forth, leaving recesses in the faces or in and along the edges of said base element.

In these recesses there are molded by one or more subsequent molding operations, contrasting colored or textured plastic or resinous materials or even in some instances low melting point metal alloys.

Among the resins which may be used, those which may be injection molded, such as cellulose acetate, styrene resins, methacrylate resins, Vinylite resins or similar thermoplastic or thermo-flowing resins, are preferred.

The invention also consists in certain new and original features of construction and combination of parts hereinafter set forth and claimed and as to its other objects, features and advantages, the mode of operation and manner of its organization, these inter alia, may be better understood by referring to the following description considered in connection with the accompanying drawings forming a part thereof, in which:

Fig. 1 is a side perspective of a lamp shaped ornament made according to the present invention;

Fig. 2 is a vertical sectional view taken on the line 2—2 of Fig. 1;

Fig. 3 is a transverse longitudinal sectional view upon the line 3—3 of Fig. 1;

Fig. 4 is a side perspective view with the added plastic broken away more clearly to show the construction;

Fig. 5 is a transverse sectional view of the bottom of an alternative form of ornament;

Fig. 6 is a top plan view of a typewriter key base molded according to the present invention;

Fig. 7 is a transverse sectional view upon the line 7—7 of Fig. 6; and

Fig. 8 is a transverse sectional view in perspective of the completely molded typewriter key.

Referring to Figs. 1 to 4, the base A is formed from a clear resin such as the methacrylate resin known in the trade as Lucite and when formed it is left with the recesses and grooves 11 at the side edges, 12 at the bottom edges, 13 at the top edges, 10 at the pyramidal edges, and a stepped recess 14, 15 and 16 in the base.

The base object 10 may take the form of a base of a lamp with a pyramidal top as shown, or a miniature animal, furniture, cooking utensil, human figure, geometrical object, or ornament shape useful for costume jewelry, key chains, desk objects, mantel piece elements, eye glass frames, book rests, pen and pencil bodies, hand bag plaques, and so forth.

Then the base molding A may be positioned in another mold and the frame B cast or molded thereon of contrasting color or texture. For example, the integral frame may include the sides 21, the lower edges 22, the top edges 23 and the pyramidal edges 24 with the top ring 25 having the opening 26 to receive a key chain. The outside faces 27 of the frame B are flush with the outside faces 28 of the base casting or molding A and give the impression or optical illusion of a hollow lantern or other object.

This illusion is increased if the red insert 30 representing a flame together with a phosphorescent, fluorescent, luminescent or radioactive pigment on the interior of the recesses 15 and 16, as indicated at 31 and 32. As shown in Fig. 5, the bottom recess 16 may also be plugged with a block 33 of the contrasting resin or plastic which may be red, green, purple and is desirably, for example, of cellulose acetate.

The base A may be held in position in the second mold by its flush sides 28 or by the sprues used to form the base A or in other manners.

Desirably, the recesses 10, 11, 12, 13 and 14, 15 and 16 if the latter are also to receive a contrasting resin on molding or casting a second time are all in communication with each other so that a single sprue or inlet for the heat flowing resin or plastic will be sufficient to fill all the recesses with the second plastic and complete the final article.

Preferably the second resin or frame B should have a slightly greater coefficient of contraction than the first resin or base A so that it will tightly cling to and contract upon said base. This effect is obtained where methyl methacrylate or polystyrene resins are used for the base while cellulose acetate resins are used for the frame, the cellulose acetate having several ten thousands greater index of contraction upon solidification.

In Figs. 6 to 8, the typewriter key base C may be molded with the recesses E forming the letter N or some other letter or symbol. The letter and the rim or frame D are to be of a contrasting color or texture of resin. The base C may have the flow passages 53 and 54 to assure flow of resin into the recesses 50 and 52 when the second resin is cast or molded onto the base C. The passages 53 and 54 open onto the shelf 56 of the rim recess 50 by the ports 57 and 58.

When the article or typewriter key is completed the letter or symbol E with the border D of contrasting color or texture will stand out sharply against the base C. The second resin or plastic if introduced into the recesses 50, 52, 53 and 54 will flow to fill up the recesses and form the final article.

By generally forming the base molding of a transparent polystyrene or methyl methacrylate resin with recesses lined with phosphorescent, luminescent or fluorescent material and with a contrasting colored frame, unusual plastic ornaments are formed which are very useful for fronts of brooches, pins or pendants, key holders and pull chains. The pigment or varnish may be a combination of zinc sulfide and a radioactive material.

If desired, the internal recesses 14, 15 and 16 may be bored into the base A after the molding or casting of the frame B or the recesses 14, 15 and 16 may be initially cast into the base A.

To achieve phosphorescence, the plastic inserts or the recesses with the insert may be coated with the phosphorescent material or the phosphorescent material, such as zinc sulphide, may be mixed in with the plastic prior to forming, molding or coating.

The base plastic element and the one or more plastic elements thereafter successively molded thereinto or thereon may be removable from one another or so keyed to one another as not to be removable. If desired several elements, successively molded on one another, may be finally permanently connected by molding a key into position.

In this manner cigarette cases, eye glass frames, compacts, cutlery handles, container covers, toys and many other articles may be formed by successive molding operations of the same or different textures, colors or types of thermosetting or thermoplastic resins.

In this manner, it is also possible to mold relatively movable parts together and therefore be certain of a close conforming fit. For example, interhinging elements or pivotally connected elements may be molded together, as may also covers for boxes and so forth.

Since certain changes may be made in the above molded articles and method of making the same and different embodiments of the invention could be made without departing from the scope thereof, it is intended that all matter contained in the above description or shown in the accompanying drawings shall be interpreted as illustrative and not in a limiting sense.

Having now particularly described and ascertained the nature of the invention, and in what manner the same is to be performed, what is claimed is:

1. A composite molded miniature lantern having a molded methyl methacrylate base and having right angular channels in the edges of said base and a cellulose acetate frame molded in the channels of the base, the outer faces of which frame are flush with the side faces of the base and continue said side faces to the edges of the base, said base being of approximately hexahedral shape to simulate approximately the shape of a small lamp and in which the center of the base is hollowed out and coated with phosphorescent material to show a candle.

2. The article of claim 1 in which said frame has a greater coefficient of contraction than said base and is in substantial tension upon said base.

I. HARTLEY STEINHARDT.

REFERENCES CITED

The following references are of record in the file of this patent:

UNITED STATES PATENTS

| Number | Name | Date |
|---|---|---|
| Re. 19,549 | Byck | Apr. 30, 1935 |
| 1,607,482 | Rudie | Nov. 16, 1926 |
| 2,062,880 | Hansen | Dec. 1, 1936 |
| 2,063,315 | Kuettel | Dec. 8, 1936 |
| 2,285,963 | Gits | June 9, 1942 |
| 2,354,857 | Gits | Aug. 1, 1944 |
| 2,455,893 | Kelly | Dec. 7, 1948 |